United States Patent
Åkerlund

(12) 
(10) Patent No.: US 6,498,966 B1
(45) Date of Patent: Dec. 24, 2002

(54) METHOD AND SYSTEM FOR DISTRIBUTION OF STAND-BY ELECTRIC POWER

(76) Inventor: John Åkerlund, Vasavägen 35, S-181 42, Lidingö (SE)

( * ) Notice: Subject to any disclaimer, the term of this patent is extended or adjusted under 35 U.S.C. 154(b) by 0 days.

(21) Appl. No.: 09/508,432

(22) PCT Filed: Sep. 10, 1998

(86) PCT No.: PCT/SE98/01611

§ 371 (c)(1),
(2), (4) Date: May 13, 2000

(87) PCT Pub. No.: WO99/14838

PCT Pub. Date: Mar. 25, 1999

(30) Foreign Application Priority Data

Sep. 17, 1997 (SE) ................................................ 9703351
Oct. 15, 1997 (SE) ................................................ 9703756

(51) Int. Cl.[7] .......................... G05D 9/00; G05B 9/02; H02J 9/00
(52) U.S. Cl. ..................... 700/296; 700/82; 700/286; 307/64; 307/65; 379/324; 455/343
(58) Field of Search ........................... 700/79, 82, 286, 700/295, 296; 379/56.2, 322–324; 455/343, FOR 216; 307/43, 64, 65, 84

(56) References Cited

U.S. PATENT DOCUMENTS

| | | | |
|---|---|---|---|
| 4,086,568 A | * | 4/1978 | Watts et al. ............... 340/3.53 |
| 4,899,129 A | | 2/1990 | MacFadyen et al. |
| 5,477,091 A | | 12/1995 | Fiorina et al. |
| 5,489,897 A | * | 2/1996 | Inoue ..................... 340/310.06 |
| 5,534,734 A | | 7/1996 | Pugh et al. |
| 5,623,531 A | | 4/1997 | Nilssen |
| 5,625,236 A | | 4/1997 | Lefebvre et al. |
| 5,664,002 A | * | 9/1997 | Skinner, Sr. ............ 340/310.01 |
| 5,734,711 A | * | 3/1998 | Kleffner ...................... 379/318 |
| 5,818,125 A | * | 10/1998 | Manchester ................... 307/44 |
| 5,828,748 A | * | 10/1998 | Akhteruzzaman ............ 379/324 |
| 5,912,957 A | * | 6/1999 | Park ........................... 379/156 |
| 6,047,063 A | * | 4/2000 | Perry ......................... 379/147 |
| 6,150,736 A | * | 11/2000 | Brill ............................ 307/19 |

* cited by examiner

Primary Examiner—Leo Picard
Assistant Examiner—Elliot Frank
(74) Attorney, Agent, or Firm—Burns, Doane, Swecker & Mathis LLP

(57) ABSTRACT

A method and system for distribution of stand-by electric power via a network separate from the standard or ordinary electric power network is disclosed. Voltages are transformed/produced in voltage sources, TR and then branched off in control devices, S, to devices, A. The devices, A, distribute the voltages to loading equipment, for instance telecommunications devices, network equipment or medical equipment. Furthermore, surveillance devices, Ö, communicate with the voltage sources, the control devices, and the devices, A, to control electronic power drains, and to transfer control orders for execution.

9 Claims, 2 Drawing Sheets

METHOD AND SYSTEM FOR DISTRIBUTION OF STAND-BY ELECTRIC POWER

TECHNICAL FIELD

The present invention relates to a method and a system for stand-by electric power distributed via network separated from the ordinary network for distribution of electric power.

TECHNICAL PROBLEM

There is a need to guarantee the electric power supply to important systems or devices during service interruptions whether they be short or long interruptions. Known solutions utilize batteries or stand-by electric power stations that are normally locally arranged at a respective system/plant. For, for instance, telecommunications operators this implies that stand-by electric power is arranged at each plant. For subscriber telecommunication terminals, the subscriber has, in each case, to arrange for the necessary stand-by electric power. Maintenance of batteries and/or standby electric power stations is burdensome both from an economical and a resource point of view. In the future, stand-by electric power, for telecommunication devices located at subscribers, will be required to guarantee the operation of the device at drop out of the ordinary electric power supply.

A general introduction of stand-by electric power is expensive and difficult, and the use of batteries on a large scale may result in unwanted environmental stress.

Example 1: Society is becoming more and more dependent on the supply of electric power and telecommunications. This increased vulnerability increases the importance of functioning telecommunications during drop outs of the ordinary electric power supply. Technical developments in the telecommunications field has resulted in an increased dependence on public electric power supply. This dependence should be reduced in order to satisfy the demands of the public on service and security.

Traditional telephone sets have electric power supply arranged via the telecommunication network. These telephone sets are operating via central battery systems, and can be utilized as a "life-line" function to call for aid in emergencies or in case of drop out of the public electric power supply. Telephony functions are utilized e.g., by electric power companies, to restore the electric power supply.

Modern and future subscriber devices are consuming electric power to such an extent that the ordinary lines of the telecommunication network can not be utilized, but electric power supply from the public electric power network is required. In order to avoid problems with telecommunications during drop out of electric power supply, it is necessary that the subscriber devices be equipped with stand-by electric power. In future telecommunication networks, fibre-optic connections will be arranged right up to the telecommunications device. As a result, the "life-line" function of traditional telephone systems will not exist.

Example 2: Technical devices which require electric power supply are used in more and more places for important functions, which should operate without interruption, in both homes and commercial and public facilities. Medical devices for care in the homes of seriously ill persons may may require stand-by electric power in order to guarantee a continuous life-sustaining process. Computer equipment for information services often requires continuous operation. Electric power demanding processes in connection with keeping of animals may be vital for the stock of animals.

In order to bridge these problems, the telecommunication network can be equipped with devices which provide stand-by electric power at a higher capacity than can be currently transmitted in the telecommunication network for internal needs and to subscriber devices. The power that can be supplied is small compared with the power capacities of the public electric networks. At electric power interruptions in the public electric networks, there consequently is a big need that stand-by electric power is available at the telecommunication subscribers. The electric power supplies at that must be restricted and strictly regulated. In order to avoid overloading, also control and power limiting systems must be introduced in order to utilize the stand-by electric power supply system optimally, and to achieve operation without problems at electric power interruptions in the ordinary electric power supply network.

The present invention has the intention to solve above mentioned problem.

PRIOR ART

It is previously known to provide systems and devices with stand-by electric power from batteries or stand-by electric power stations. Operation of conventional telephone equipment has been arranged by the output voltage from the telephone lines. Increased security in electric power supply also has been arranged by connection of a multiple of electric power distribution networks.

Device for surveillance and control of the electric power consumption according to plan in system or equipment is known from e.g., U.S. Pat. No. 5,625,236.

THE SOLUTION

The present invention constitutes a method and a system for distribution of stand-by electric power characterized in the following patent claims.

The present invention relates to distribution of electric power which is controlled via a telecommunication network. Voltages are transformed/produced in voltage sources, TR. These voltages are branched off in control devices, S, to devices, A, which distribute the voltages to the subscribers' systems/equipment, for instance telecommunications equipment, computer equipment and the like. Surveillance devices, O, communicate with the voltage sources, the control devices, and the respective the devices, A, concerning measurement of the current electric power drain, and the transferring of control orders for execution of changes in electric power drain, connection and disconnection.

ADVANTAGES

The invention implies that electric power is distributed alternative routes in relation to ordinary electric power distribution. Further is offered that an alternative distribution of electric power is obtained in case of drop out of electric power from the electric power supplier. The provides, on one hand, to arrange a common electric power source which will function when ordinary electric power supply has dropped out, and on the other that, systems/equipment which require electric power from the electric power network will also function when distribution of electric power from the ordinary electric power supplier has dropped out. The control system further makes possible control of drained power, such that the utilization of available power can be optimized with regard to actual need. The invention further provides that the stand-by electric power system can be dimensioned optimally in relation to foreseen needs. In traditional electric power systems the system is dimensioned according to a maximal need to prevent overload. The present invention includes control functions which supervise the load in the different parts of the stand-by electric power network, and disconnect parts which give rise to overload. Further, the load in the different parts of the electric power network can be controlled at different occasions.

PREFERRED EMBODIMENT

Figure 1:
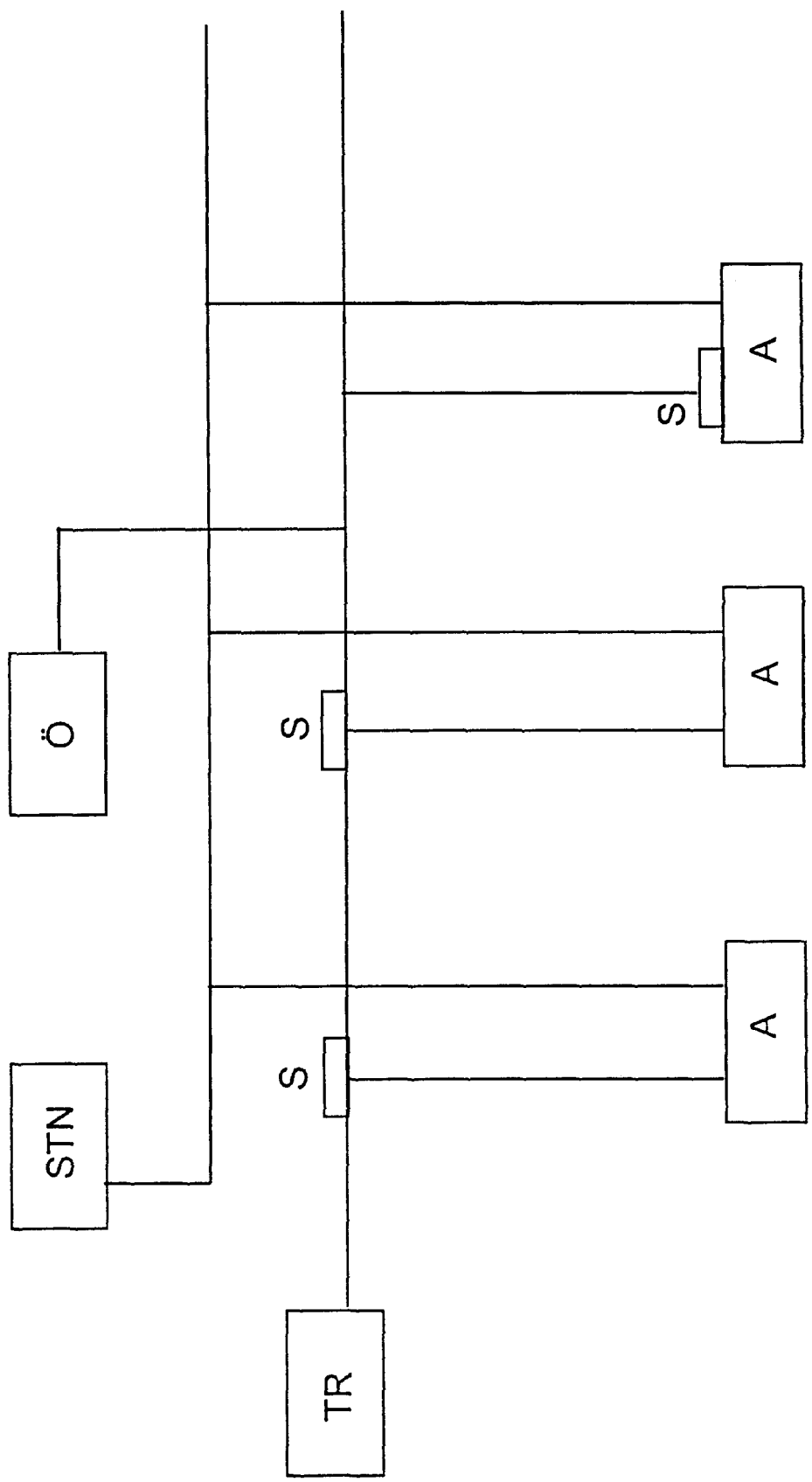
FIG. 1 shows block diagram of a system in accordance with an embodiment of the invention.
Figure 2:
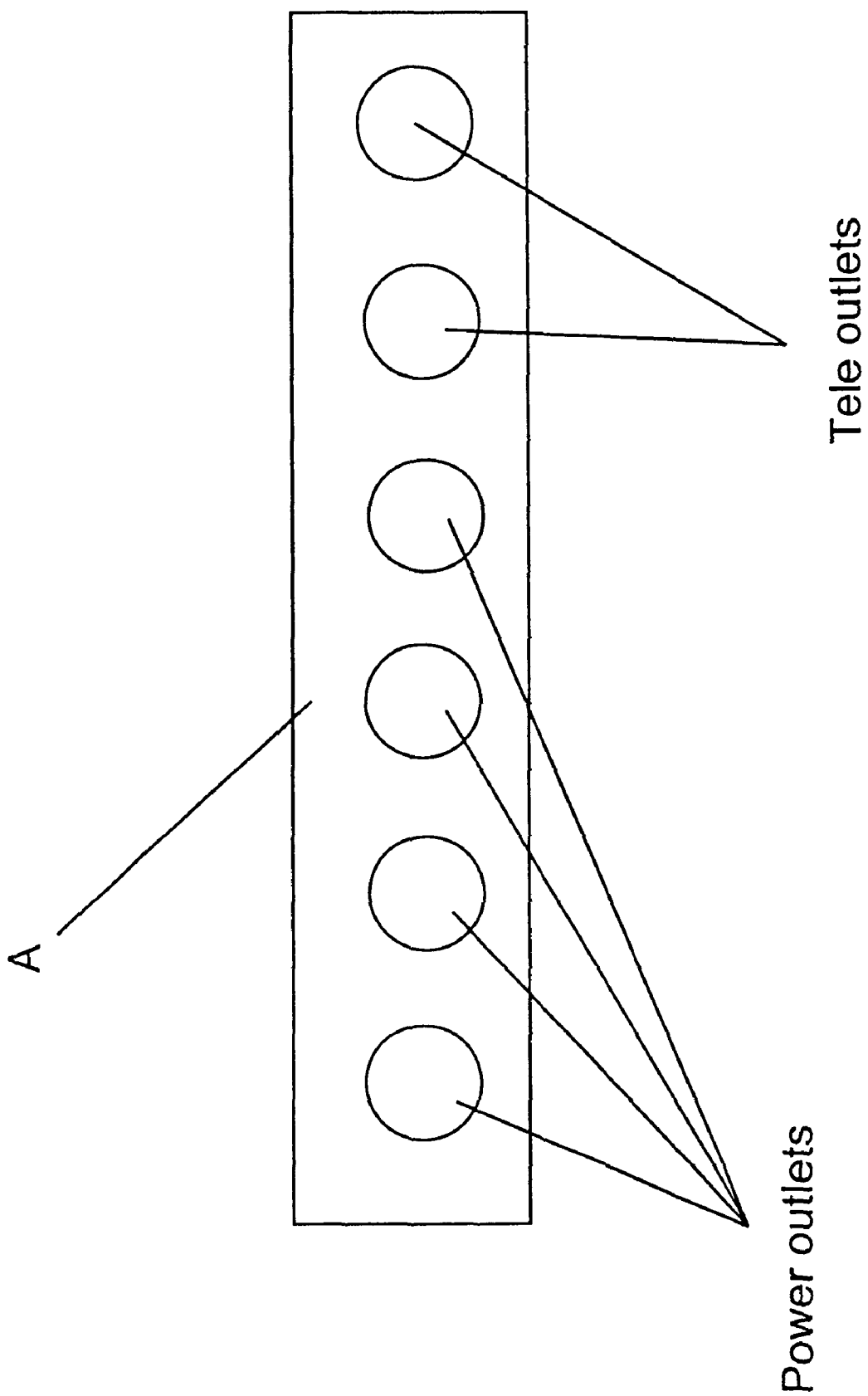
FIG. 2 shows block diagram of a device A, in accordance with an embodiment of the invention.

In the following, the invention is described on basis of the figures and the indications in them.

A separate electric power network is provided by a supplier of stand-by electric power, in addition to the standard power supply network, STN. Stand-by electric power network voltages are distributed via voltage sources, TR, for instance transformers, electric power stations and the like. These voltage sources produce alternating or direct voltages adapted to the characteristics of the distribution network. These first voltages are distributed out on the network. The produced electric power is received in control devices, S, placed in points in the electric power network where the voltages are branched off. The branched off voltages consist of other voltages suited to be transferred in the branched off networks. These control devices can in other embodiments be placed close to, or in, devices, A, placed at subscribers. The control devices include voltage converters which convert the transferred voltage to a third voltage, for instance 220 V that is appropriate for user devices.

The control devices are equipped with communicative means and means for control of drained electric power. The control devices further include functionalities for connection and disconnection of the electric power distributed to the devices, A. In order to determine the electric power drain, the control devices include units which define the allowed power drain for each device's respective equipment. The control devices, S, obtain information by permanent programming, or by external measures. A first external measure is that users connected to the devices, A, are allocated cards which are connected in the control device, S, and/or the devices, A. These cards preferably are of type smart cards, i.e. cards equipped with micro chips which have been programmed by supplier of stand-by electric power. For validity and/or security measures an identification of the control device/device and, if necessary, also an identification for the subscriber and the allowed maximal drained power are provided on the cards. The identification consists of numeric or alphanumeric information which clearly indicates each plant. Said card is pushed into the control device in for this purpose intended place, for instance a slot into which the card is inserted, or a special cardplace in the control device. In the latter case, the connection is preferably made by personnel authorized by the supplier of the stand-by electric power. In the first case, the user of the equipment buys or receives the card over the counter. The user after that himself/herself applies the card to the equipment. Further alternatives are that changes in the control equipment are transferred to the control equipment by programming via the telecommunication network. In this case the operator indicates the identification for the control device in question and actual plant. The control device responds to the call with agreed signals, after which the programming changes can be introduced. The programming can also be introduced in a central database which is utilized by the control system for programming of the control devices.

In the cases where the control system utilizes one or more databases, the control system controls time of the 24 hour period, days of the week, existing holidays, time of the year etc. Depending on these criteria is after that decided, by utilizing suitable software, which changes in existing restrictions that shall be introduced. In this way available electric power can be distributed according to an actual need, which also makes it possible for the supplier of stand-by electric power to efficiently optimize his/her resources for distribution.

The invention provides, for instances that a plurality of telecommunication stations and nodes in the telecommunication network can be allocated stand-by electric power over an alternative electric power network in the cases where ordinary electric power distribution has dropped out. To the telecommunications operator this means that surveillance of batteries and/or local stand-by electric power stations can be minimized without the functionality of the telecommunication network being at hazard.

The devices, A, further include the ability to connect a plurality of subscriber devices, for instance telephones, data equipment etc, in order to obtain electric power. Each connection is arranged to obtain an individually defined power drain. Alternatively a maximal power drain is given for a defined system/plant, or for a subscriber of stand-by electric power.

The control devices, S, further, are in their database given instructions regarding the control of the electric power system in case of power drop out, which affects the electric power distribution in the electric power network. In such cases, the plants are prioritized according to the public welfare, or other relevant criteria.

According to the invention a first voltage is converted in voltage sources, TR. These voltage sources consist of transformers which obtain their driving voltage from an ordinary electric power network. These voltage sources, TR, further are equipped with stand-by electric power feeding, which is connected in case of drop out of the electric power supply from supplier/suppliers of electric power. The stand-by electric power is produced in customary way by generators driven by diesel engines or other suitable device. Alternatively, or as complement, batteries are utilized which via inverters produce the necessary electric power until its stand-by electric power supply is in operation. In connection to the voltage sources, TR, there are sensing units which measure phase, frequency and voltage, which information is transmitted to surveillance devices, Ö, via, for example, the telecommunication network. The surveillance devices find out whether the measured parameters are in accordance with decided criteria. If deviations are found, orders for corrections are returned. The surveillance device, Ö, further compares the electric power supply from different voltage sources, and orders them individually for adjustments for supply of a promised electric power quality. In the described, the starting point is that alternating voltage shall be supplied from the voltage sources, TR, but the procedure also can be applied at distribution of direct voltage with necessary modifications. The from the voltage sources supplied voltages are adapted to a current need, for instance "household voltage" at direct supply to subscriber, or other voltage which is transformed to suitable distribution voltage.

The produced voltage after that is transferred in the electric power network to control devices, S, where the electric power is transferred to the devices, A. The control devices, S, include corresponding communicative means and the voltage sources, TR, for communication with the surveillance device, Ö. The surveillance device, Ö, receives information from the control device regarding drained electric power and returns control order, which may relate to switchings in the network, such as disconnection of a load if power drain is too high.

Each of the devices, A, is equipped with one or more outlets where one or more devices, for example, telephones, data-equipment, telephone exchanges, medical equipment and the like are connected. Each outlet can be defined for individual electric power drain. The surveillance of the power drain in each of the outlets is made in corresponding way as has been described above. In order to reduce the risk of too high power drain, due to communication problems, each device is equipped with local surveillance. The parameters for this surveillance is transferred in a first case from the surveillance device, Ö, to the local memory of the device and surveillance system. In the case that too high a power drain is observed in the control system of the device, disconnection is executed in the same way as has previously been described. Information regarding allowed electric power drain is further programmable via separate terminal or by means of, for instance, a smart card.

By the utilization of programmed surveillance, power drain is made possible which varies in time, for instance depending on time in the twenty-four hours, day of the week, holidays, season etc. The construction of the stand-by electric power network in this way can be adapted to the need to utilize the stand-by electric power network optimally and avoid fatal overloads.

Telephones, data equipment, telephone exchanges, nodes in the telecommunication network, medical equipment and/or other devices at subscribers of stand-by electric power can be connected with a stand-by electric power network which is laid together with the telecommunication network. The electric power network at this need not necessary be laid parallel with the telecommunication network, but other arrangements of laying are possible. Stand-by electric power is generated by for instance diesel engines arranged at, or at least in connection with, at least some telephone exchanges. At the same places are further connected public electric power supply. The electric power from the public electric power network, or the stand-by electric power, is distributed in the stand-by electric power network to subscribers of stand-by electric power. In the network terminals are further arranged outlets for electric power supply to the subscribers' systems/devices.

The invention relates to distribution of stand-by electric power. The voltage is produced/transformed in, for instance, diesel generators or transformers. The distribution to subscribers of stand-by electric power can be made on different voltage levels and transformed in one or more steps to suitable voltage for the subscriber's need, and be supplied for instance as "household voltage", one or three phase. Centrally the supplier of stand-by electric power has a control computer with database. The subscriber is allowed a maximal power which must not be exceeded. In the nodes of the stand-by electric power network, the voltages are transformed and branched off. There also are surveillance and control devices, which are permanently programmed, or can be programmed from the control system. They are independently executing, or can be ordered from the control-system. If the power drain exceeds subscribed power, the control devices are activated and disconnect the subscriber. In the measuring unit of the control unit there may be basic data for debiting of consumption of stand-by electric power. The control system will, via the telecommunication network, have information about current load situation and can, on basis of information in the database, decide which subscribers that exceed their allowed power. The control system orders the control devices to disconnect these subscribers and prevents that the stand-by electric power system is overloaded and has to make an emergency stop, with functional trouble as a consequence. The control system puts together data for debiting.

The invention is not restricted to the above described example of embodiment or to following patent claims, but may be subject to modifications within the frame of the idea of the invention.

What is claimed is:

1. System for distribution of stand-by electric power, characterized in that the system includes stand-by electric power production in stand-by electric power stations or transformers (TS) distributing electric power to devices (A) over a separate electric power network, which is separated from the electric power suppliers electric power network, that maximal values for the electric power drain of said devices are decided in control devices (S), that load is switched on basis of drained electric power, available electric power and stored or added criteria, and that the control devices obtain information regarding allowed drained electric power at each of said electric power drains, the electric power drain of which is arranged to be depending on the time of the twenty-four hours, day of the week, and season.

2. System according to patent claim 1, characterized in that said control devices are located in immediate connection to said devices and/or at branch points for the electric power distribution to said devices, and that said control devices include voltage converting devices, and that to each of said control devices one or more of said devices are connected, and that the control devices are arranged to supervise each electric power drain of said devices separately.

3. System according to patent claim 1, characterized in that the control devices obtain information regarding allowed drained electric power at each of said electric power drains, the electric power drain of which is arranged to be depending on the time of the twenty-four hours, day of the week, and season.

4. System according to claim 1, characterized in that information is transmitted from centrally located control system included in the system to said control devices regarding allowed electric power that can be drained, that information regarding allowed electric power that can be drained is stored in said centrally located control system, and that allowed electric power that can be drained can be stored locally in said control device.

5. System according to claim 1 characterized in that a centrally located control system obtains information regarding allowed electric power drain for said devices via central programmings, that said information is transferred to said control devices via a telecommunications network, and that the locally located storing devices obtain information regarding allowed electric power drain via special information transmitters, and that during drop out of communication between said control devices and said centrally located control systems, the information which has been stored in the local storing devices applies.

6. System according to claim 1, characterized in that each of said devices is allocated a unique identification, that the identification is transmitted in a telecommunication network from said control devices to a centrally located control system, that information regarding drained electric power is transmitted to said centrally located control system together with the identification, and that the transmissions in the telecommunication network are digital.

7. System according to claim 1, characterized in that surveillance devices (Ö) included in the system store information regarding said devices, that said surveillance devices optimize the utilization of the stand-by electric power system by allocating said devices the electric power which is predetermined, respective the electric power which can be allowed with regard to a current situation, and that said surveillance device synchronizes to the, to the stand-by electric power system connected, voltage transformers, such as stand-by electric power stations, transformers and inverters.

8. System for distribution of stand-by electric power, characterized in that the system includes stand-by electric power production in standby electric power stations or transformers (TS) distributing electric power to devices (A) over a separate electric power network, which is separated from the electric power suppliers electric power network, that maximal values for the electric power drain of said devices are decided in control devices (S), that load is switched on basis of drained electric power, available electric power and stored or added criteria, and that a first voltage is produced at said stand-by electric power production, that said first voltage is converted to at least a second voltage in said control device, that said second voltage is distributed to said devices, which convert said second voltage to a third voltage, for instance a household voltage.

9. System according to claim 1, characterized in that the stand-by electric power consumption is registered in the devices (A), that the information regarding the stand-by electric power consumption is transmitted to the surveillance devices (Ö) and stored in the database, and that the information data for the debiting is put together in said centrally located control system regarding the stand-by electric power consumption.

* * * * *